(12) United States Patent
Ravid et al.

(10) Patent No.: US 9,405,287 B1
(45) Date of Patent: Aug. 2, 2016

(54) APPARATUS AND METHOD FOR OPTICAL CALIBRATION OF WAFER PLACEMENT BY A ROBOT

(71) Applicant: APPLIED MATERIALS, INC., Santa Clara, CA (US)

(72) Inventors: Abraham Ravid, San Jose, CA (US); Todd J. Egan, Fremont, CA (US); Eran Weiss, Sunnyvale, CA (US); Michael R. Rice, Pleasanton, CA (US); Izya Kremerman, Los Gatos, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 14/806,220

(22) Filed: Jul. 22, 2015

(51) Int. Cl.
*G06F 7/00* (2006.01)
*G06F 19/00* (2011.01)
*G05B 19/19* (2006.01)

(52) U.S. Cl.
CPC ...... *G05B 19/19* (2013.01); *G05B 2219/39157* (2013.01); *G05B 2219/40572* (2013.01)

(58) Field of Classification Search
None
See application file for complete search history.

(56) References Cited

U.S. PATENT DOCUMENTS

| | | | |
|---|---|---|---|
| 5,999,268 A | 12/1999 | Yonezawa et al. | |
| 6,237,393 B1 | 5/2001 | Ames et al. | |
| 6,471,464 B1 | 10/2002 | Fay et al. | |
| 6,973,370 B2 | 12/2005 | Ito et al. | |
| 7,319,920 B2 | 1/2008 | Donoso et al. | |
| 7,479,236 B2 | 1/2009 | Chen et al. | |
| 7,933,009 B2 | 4/2011 | Serebryanov et al. | |
| 8,060,330 B2 | 11/2011 | O'Neill et al. | |
| 8,139,219 B2 | 3/2012 | George | |
| 8,600,150 B2 | 12/2013 | Lee et al. | |
| 8,751,047 B2 | 6/2014 | Rodnick et al. | |
| 2006/0023182 A1* | 2/2006 | Novak | G03F 7/70341 355/53 |
| 2012/0264051 A1* | 10/2012 | Angelov | H01L 21/683 430/256 |
| 2013/0014784 A1* | 1/2013 | Ito | G03F 7/423 134/10 |
| 2013/0309848 A1* | 11/2013 | Young | C30B 25/08 438/478 |

FOREIGN PATENT DOCUMENTS

WO WO 2014/144533 A1 9/2014

OTHER PUBLICATIONS

U.S. Appl. No. 14/310,560, filed Jun. 20, 2014, Potter, Sr.
U.S. Appl. No. 62/018,224, filed Jun. 27, 2014, Griffin et al.

* cited by examiner

*Primary Examiner* — Yolanda Cumbess
(74) *Attorney, Agent, or Firm* — Robert M. Wallace (57) ABSTRACT

An optical calibration method and apparatus for calibration of wafer positioning within a reactor chamber under process conditions employs an array of cameras in a lid of the chamber using images of the wafer edge to locate the wafer relative to the reference feature.

20 Claims, 9 Drawing Sheets

APPARATUS AND METHOD FOR OPTICAL CALIBRATION OF WAFER PLACEMENT BY A ROBOT

BACKGROUND

1. Technical Field

The disclosure is related to robotic placement of a workpiece, such as a semiconductor wafer, onto a workpiece support in a reactor chamber, and improved calibration of the wafer location.

2. Background Discussion

There is a need for a method of calibrating wafer positioning by a robot under the actual process conditions of chamber pressure, temperature, etc. The problem is to resolve calibration challenges due to inaccessibility of the chamber interior while under actual process conditions, where there is no way to perform a mechanical calibration. As an example, there is a need to calibrate some chambers while at high temperature, high vacuum or other constraints. Such constraints prevent performing the calibration by mechanical means, such as pin dropping mechanisms or micro cameras mounted on a wafer. In some cases, higher accuracy than what mechanical calibration can achieve may be required. Misplacement of a wafer in a process chamber may lead to process excursions, out of specification results in some areas, and makes it difficult to optimize the process.

SUMMARY

A configurable assembly comprises (a) a reactor chamber body having an open top and a workpiece support in the reactor chamber body, (b) a first lid receivable on the open top to form a seal on the open top, and comprising plural cameras viewing respective fields of view inside the reactor chamber body, (c) a second lid receivable on the open top to form a seal on the open top and comprising process features, each one of the first and second lids being removable from the open top for placement of the other one of the first and second lids on the open top, (d) a workpiece-handling robot for transporting a workpiece relative to the workpiece support, wherein the respective fields of view correspond to respective edge portions of the workpiece when held on the workpiece support, and (e) a processor coupled to receive images from the plural cameras and coupled to control the workpiece-handling robot.

In one embodiment, the process features of the second lid comprise a gas distribution plate and an RF power applicator.

In one embodiment, the respective fields of view further correspond to respective portions of a reference feature in the reactor chamber body.

In one embodiment, the reference feature is the workpiece support.

In one embodiment, the processor is adapted to determine from the images a correction movement of the workpiece that reduces non-concentricity between the workpiece and the workpiece support.

In one embodiment, the processor is coupled to command the workpiece-handling robot to perform the correction movement.

In one embodiment, the workpiece and the workpiece support are each circular.

In one embodiment, the cameras have respective fields of view uniformly spaced at periodic intervals relative to a circumference of the workpiece support. In one embodiment, the periodic intervals correspond to 90 degree angles.

One embodiment further comprises respective viewing ports extending through the first lid between respective ones of the plural cameras and the respective fields of view.

A method of processing a workpiece comprises (a) providing a reactor chamber body having an open top and a workpiece support inside the reactor chamber body, (b) placing a first lid on the open top, setting chamber pressure in the reactor chamber body to a selected level, and robotically placing a workpiece on the workpiece support, and (c) capturing through the first lid respective images of portions an edge of the workpiece and an edge of a reference feature in the reactor chamber body in respective fields of view spaced at periodic locations relative to a circumference of the workpiece support and determining a non-concentricity between the workpiece and the reference feature. If the non-concentricity exceeds a predetermined threshold, the method proceeds by determining from the respective images a correction vector representing a change in location of the workpiece corresponding to a decrease in non-concentricity between the workpiece and the reference feature, and robotically shifting the workpiece in accordance with the correction vector, and then repeating the capturing, determining and shifting. If the non-concentricity is less than the predetermined threshold, the method proceeds by storing in memory the present location of the workpiece, replacing the first lid with a second lid comprising process features, establishing process conditions in the reactor chamber body, and robotically placing each one of a succession of workpieces on the workpiece support at the present location.

In one embodiment, the reference feature is the workpiece support.

In one embodiment, the process features of the second lid comprise an RF power applicator and a gas distribution apparatus, and establishing process conditions comprises providing RF power to the RF power applicator, providing process gas to the gas distribution apparatus and activating a vacuum pump coupled to the reactor chamber body.

In one embodiment, determining non-concentricity comprises measuring in the respective images edge-to-edge distances along positive and negative portions of respective axes between the workpiece and the reference feature, determining differences between edge-to-edge distances along the positive and negative portions of each of the axes, and adding the differences.

In one embodiment, determining from the respective images a correction vector comprises: measuring in the respective images edge-to-edge distances along positive and negative portions of respective axes between the workpiece and the reference feature, determining differences between edge-to-edge distances along the positive and negative portions of each of the axes, and defining components of the correction vector along respective ones of the axes as the differences along the corresponding axes.

In one embodiment, capturing through the first lid respective images comprises capturing images through respective cameras on the first lid in respective fields of view coinciding with intersections between respective ones of the axes and the edge of the workpiece support.

In accordance with another embodiment, an assembly is provided for calibrating robotic placement of a workpiece having a workpiece edge on a workpiece support surface having a support edge. The assembly comprises: (a) a reactor chamber body having a top opening and containing the workpiece support surface; (b) a lid removably installable on the reactor chamber body and comprising top and bottom surfaces, the bottom surface comprising a sealing shoulder receivable on the top opening, and plural viewing ports extending through the lid along a direction transverse to the top and bottom surfaces; (c) plural cameras mounted on the lid along respective axes, and having respective fields of view through respective ones of the plural viewing ports, the respective fields of view coinciding with respective intersections of the support edge and respective ones of the axes; and (d) a processor coupled to receive from the cameras images of the support edge and of the workpiece edge, corresponding to workpiece edge-to-support edge distances along respective ones of the axes.

In one embodiment, the assembly further comprises a processor adapted to determine from the workpiece edge-to-support edge distances a shift in position of the workpiece for reducing non-concentricity between the workpiece edge and the support edge.

In one embodiment, the respective axes are mutually orthogonal and the plural cameras comprises four cameras.

In an embodiment, the assembly further comprises a workpiece handling robot with the reactor chamber body, the processor coupled to the workpiece handling robot.

BRIEF DESCRIPTION OF THE DRAWINGS

So that the manner in which the exemplary embodiments of the present invention are attained can be understood in detail, a more particular description of the invention, briefly summarized above, may be had by reference to the embodiments thereof which are illustrated in the appended drawings. It is to be appreciated that certain well known processes are not discussed herein in order to not obscure the invention.

FIGS. 1A and 1B depict respective configurations of a reactor having exchangeable lids for installation on an open top of a reactor chamber body, of which FIG. 1A depicts a first configuration in which a process lid is installed on the reactor chamber body, and FIG. 1B depicts a second configuration in which a metrology lid is temporarily installed on the reactor chamber body instead of the process lid.

To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION

A non-contact optical calibration method and apparatus is provided for the calibration of wafer positioning within a reactor chamber under process conditions. A process lid of the reactor chamber is temporarily removed and replaced with a special lid, referred to as a metrology lid, A number of cameras (e.g., four cameras) are mounted on the metrology lid. The cameras view respective areas inside the reactor chamber that contain the electrostatic chuck or pedestal or lift pins that the wafer is mounted on, and/or other key features of interest in the chamber, such as masks, process kits, etc., that are landmarks from which location may be determined. The wafer may be either a regular wafer used in production or a specially designed wafer. In one embodiment, the cameras are provided with telecentric lenses which allow for high depth of field, with no geometrical distortion and with fixed magnification over a large vertical and lateral distance, which include all the features involved in the calibration. This allows the determination of the location of edges of components in the chamber that are important for the process. The images formed this way are analyzed, to determine the alignment of the wafer relative to components or landmarks in the reactor chamber. In one embodiment, the system may calibrate the resolution and the magnification of the optics by using known dimensions of features on the chuck to calculate pixel resolution and magnification for each camera. This calibration may be performed with or without telecentric lenses. This information is used to guide the wafer-handling robot during calibration. The calibration may be automated to reduce tool downtime, and avoid performance variations due to human errors involved in the process, and variations due to skill level of the operator. In embodiments described below, the wafer position is determined from images of the circular edge of the wafer and of the edge of the electrostatic chuck.

Figure 1A:
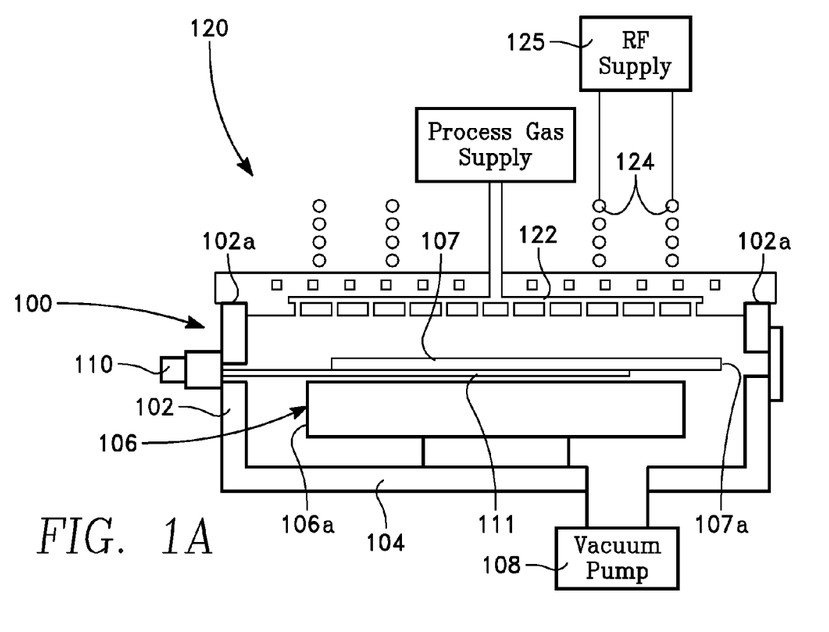
Figure 1B:
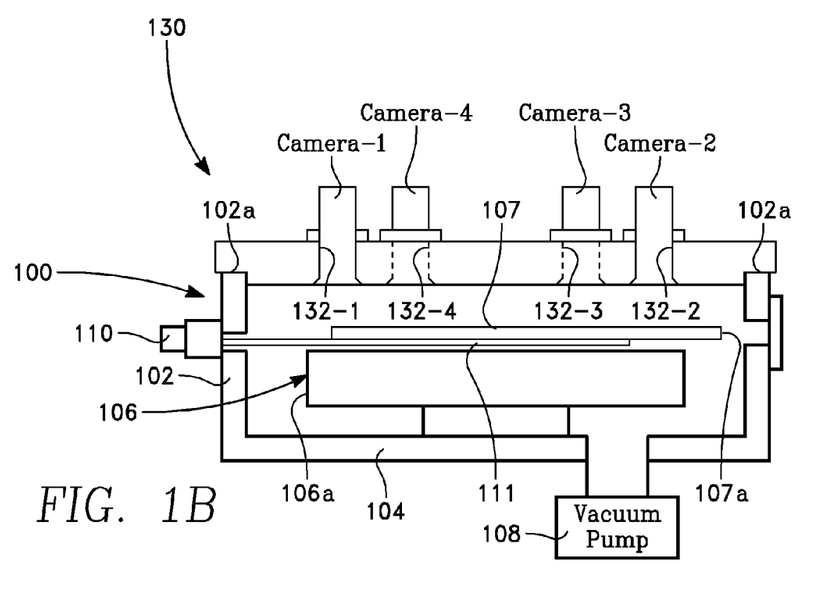

Referring to FIGS. 1A and 1B, a reactor chamber body 100 having a cylindrical side wall 102 and a floor 104 contains a wafer support which may be an electrostatic chuck 106 with a circular edge 106a for holding a workpiece such as a semiconductor wafer 107 having s circular edge 107a. A vacuum pump 108 is coupled to the interior of the reactor chamber body 100 to control chamber pressure. A robot 110 places the wafer 107 on the electrostatic chuck 106 in accordance with a desired wafer location. Ideally, the location is such that the wafer 107 is centered relative to the electrostatic chuck 106, as will be discussed below.

The cylindrical side wall 102 of the reactor chamber body 100 has a top edge 102a defining an open top of the reactor chamber body 100. The top edge is capable of receiving either one of two circular lids, namely a process lid 120 (shown in FIG. 1A as installed on the reactor chamber body 100) or a metrology lid 130 (shown in FIG. 1B as installed on the reactor chamber body 100 instead of the process lid 120). The process lid 120 is on the reactor chamber body 100 during processing of the wafer 107. Installation of either the process lid 120 or the metrology lid 130 on the top edge 102a completes a vacuum seal of the interior of the reactor chamber body 100.

Prior to processing, an end effector or arm 111 of the robot 110 positions the wafer 107 on a top surface of the electrostatic chuck 106. In one embodiment, it is desired that the wafer 107 be centered relative to the center of the electrostatic chuck 106. This result is desired for each wafer that is introduced into the reactor chamber body 100, for consistent wafer positioning for a succession of wafers.

Wafer positioning on the electrostatic chuck 106 by the robot 110 is calibrated using contemporaneous images of the electrostatic chuck 106 and of the wafer 107. During such calibration, the metrology lid 130 is on the reactor chamber body 100, instead of the process lid 120. The process lid 120 includes various processing features such as a gas distribution plate 122, RF power applicators such as coil antennas 124 fed by an RF power supply 125, thermal control features (not shown), etc. The presence of such processing features makes it difficult to provide an unobstructed field of view through the process lid 120 needed to capture the images. The metrology lid 130 is free of such process features and therefore can provide an essentially unobstructed view of the interior of the reactor chamber body 100. Further, the metrology lid 130 enables the interior of the reactor chamber body 100 to be held at actual process conditions (e.g., chamber pressure, chamber temperature, etc.) during calibration.

Figure 2:
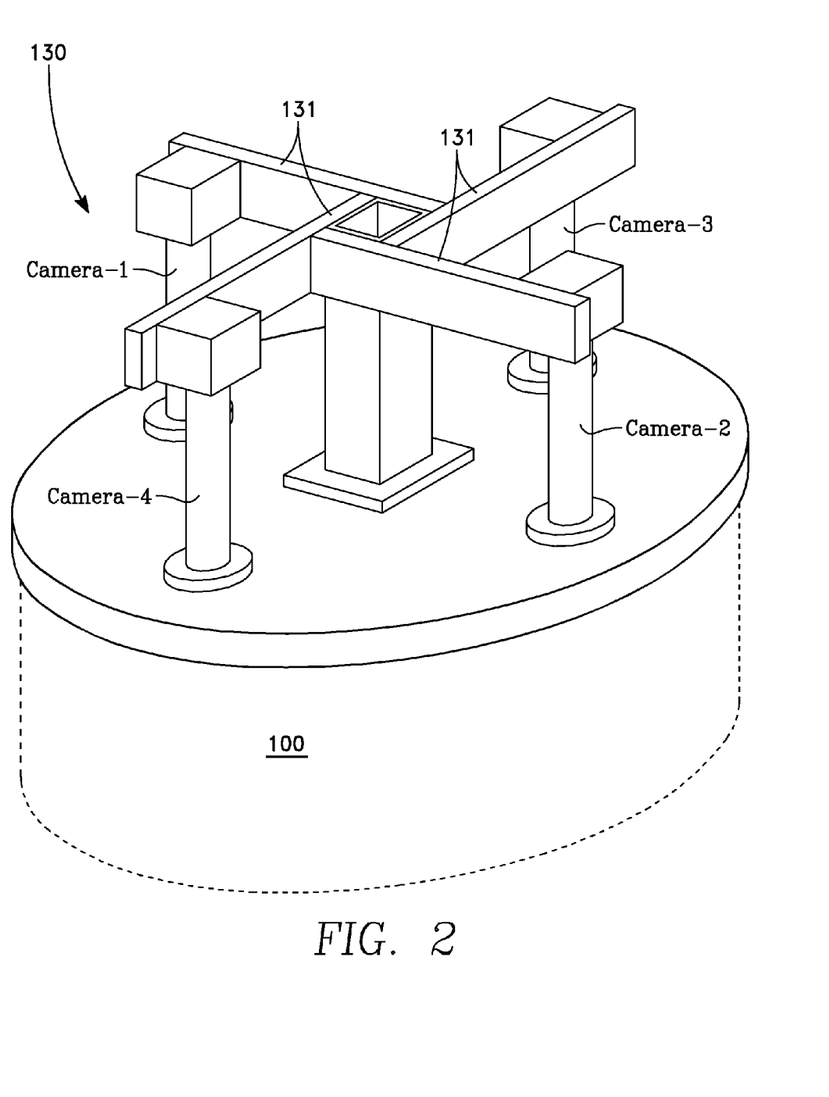
FIG. 2 depicts an orthographic projection of the metrology lid of FIG. 1B.
Figure 3:
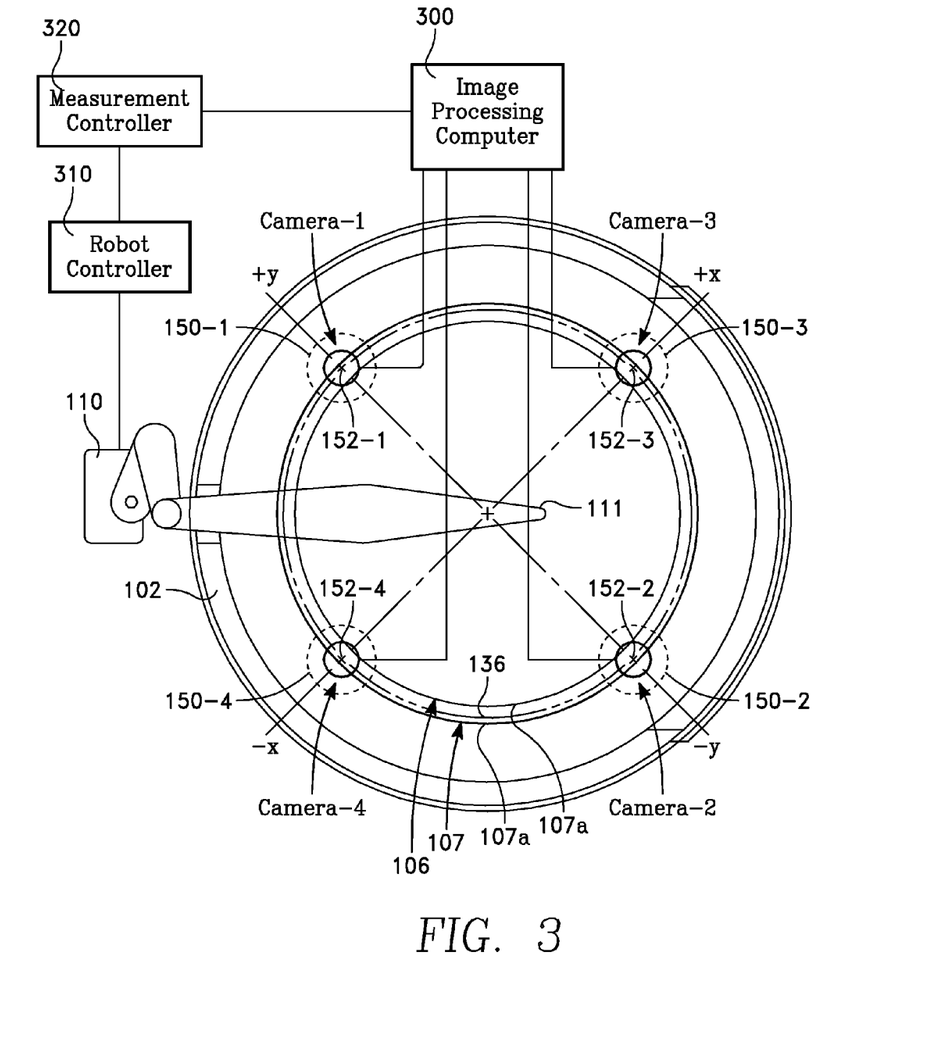
FIG. 3 represents a partially cut-away top view of the assembly of FIG. 1B.

Referring to FIGS. 1B and 2, a number of cameras (e.g., four cameras) labelled camera 1, camera 2, camera 3 and camera 4, are mounted on the metrology lid 130 with support structure 131 and view the interior of the reactor chamber body 100 through respective ports 132-1, 132-2, 132-3 and 132-4 in the metrology lid 130. As shown in FIG. 3, cameras 1, 2, 3 and 4 are located along an imaginary circle 136 at respective locations separated by 90 degrees. Cameras 1 and 2 are located along positive and negative portions, respectively, of a Y-axis near its intersection with the imaginary circle 136. Cameras 3 and 4 are located along positive and negative portions, respectively, of an X-axis near its intersection with the imaginary circle 136. The X-axis and the Y-axis define a camera coordinate system, in which the intersection of the X-axis and Y-axis defines an origin. In one embodiment, the origin coincides with an axis of symmetry of the reactor chamber body 100 or of the electrostatic chuck 106.

Prior to processing a wafer in the reactor chamber body 100, a wafer positioning calibration method is performed, requiring removal of the process lid 120 from the reactor chamber body 100 and installation of the metrology lid 130 on the reactor chamber body 100. During the calibration, images of portions of the electrostatic chuck 106 and of the wafer 107 are captured through the metrology lid 130 by cameras 1, 2, 3 and 4. From these images, the location of the center of the electrostatic chuck 106 relative to the center of the wafer 107 may be determined. In one embodiment, the images are of different portions of the edge 106a of the electrostatic chuck 106 and of different portions of the edge 107a of the wafer 107. In the embodiment of FIG. 3, four images are captured simultaneously corresponding to four fields of view 150-1, 150-2, 150-3 and 150-4 of the four cameras 1, 2, 3 and 4, respectively. The four images coincide with four vertices 152-1, 152-2, 152-3 and 152-4 at which the circle 136 intersects the X-axis and Y-axis. In the embodiment of FIG. 3, non-concentricity of the edge 106a of the electrostatic chuck 106 with the edge 107a of the wafer 107 is determined. In one embodiment, the field of view of each one of cameras 1, 2, 3 and 4 is sufficiently large to encompass a corresponding portion of both edges 106a and 107a.

In one embodiment, the wafer diameter is less than the electrostatic chuck diameter so that both edges 106a and 107a may be viewed simultaneously and their images captured simultaneously. Otherwise, the edge 106a of the electrostatic chuck 106 is observed (captured as an image) prior to placing the wafer 107 on the electrostatic chuck 106. Thereafter the wafer 107 is placed on the electrostatic chuck 106, covering the electrostatic chuck 106, and images of the edge 107a of the wafer 107 are captured.

Figure 4:
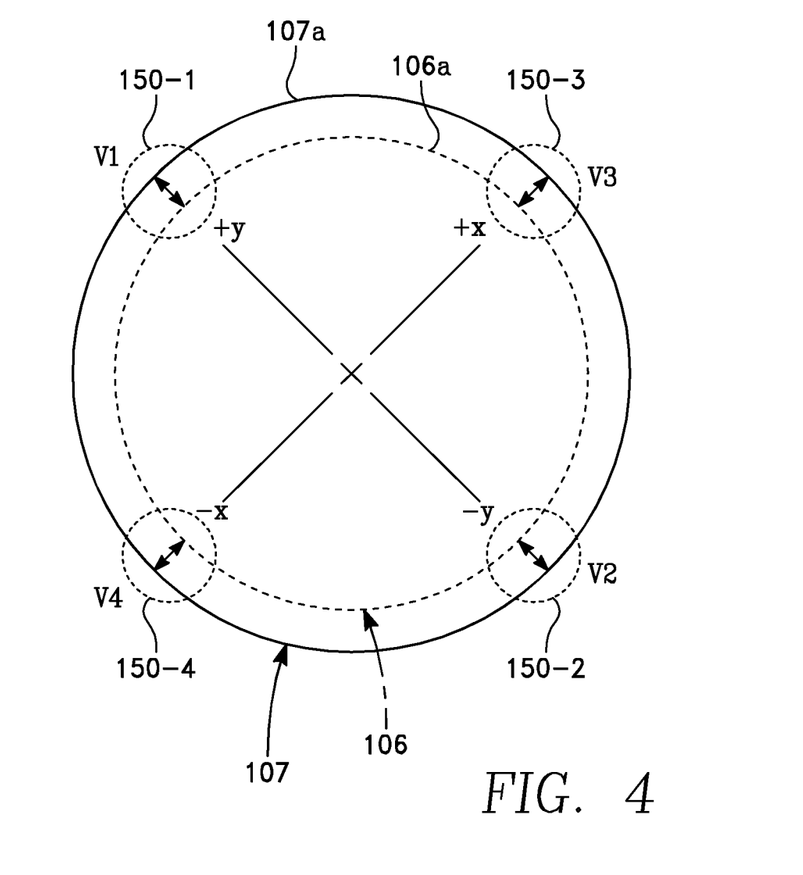
FIG. 4 is a view corresponding to FIG. 3 representing a case in which wafer placement is centered.

Concentricity of the edges 106a and 107a is determined from selected edge-to-edge distances between them. Referring to FIG. 4, a first edge-to-edge distance V1 between the edges 106a and 107a is along the positive portion (+Y) of the Y-axis, and is measured in the image captured by camera 1. A second edge-to-edge distance V2 is along the negative portion (−Y) of the Y-axis, and is measured in the image captured by camera 2. A third edge-to-edge distance V3 is along the positive portion (+X) of the X-axis, and is measured in the image captured by camera 3. A fourth edge-to-edge distance V4 is along the negative portion (−X) of the X-axis, and is measured in the image captured by camera 4. The measuring of the edge-to-edge distances V1, V2, V3 and V4 may be carried out by counting the number of image pixels between edges in the respective images. Each edge-to-edge distance V1, V2, V3 and V4 is viewed by a corresponding one of camera 1, camera 2, camera 3 and camera 4.

Figure 4A:
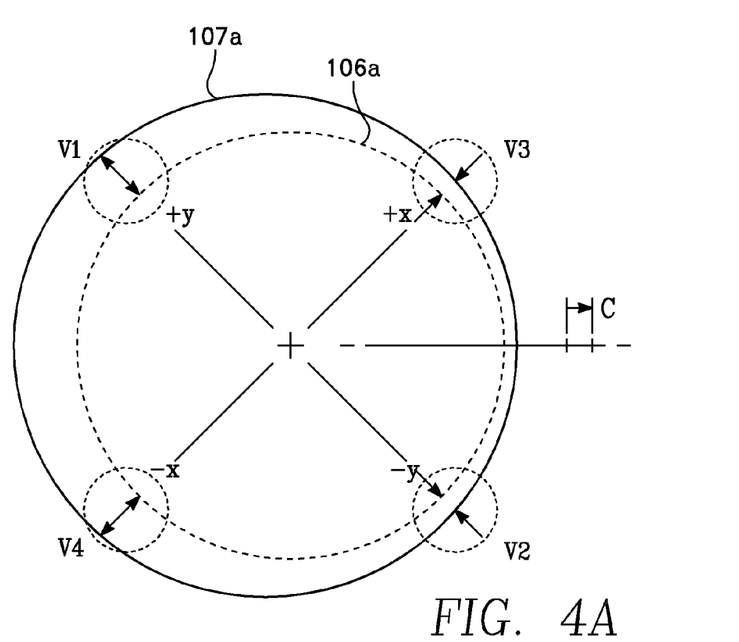
FIGS. 4A and 4B are views corresponding to FIG. 4 in which wafer placement is not concentric.
Figure 4B:
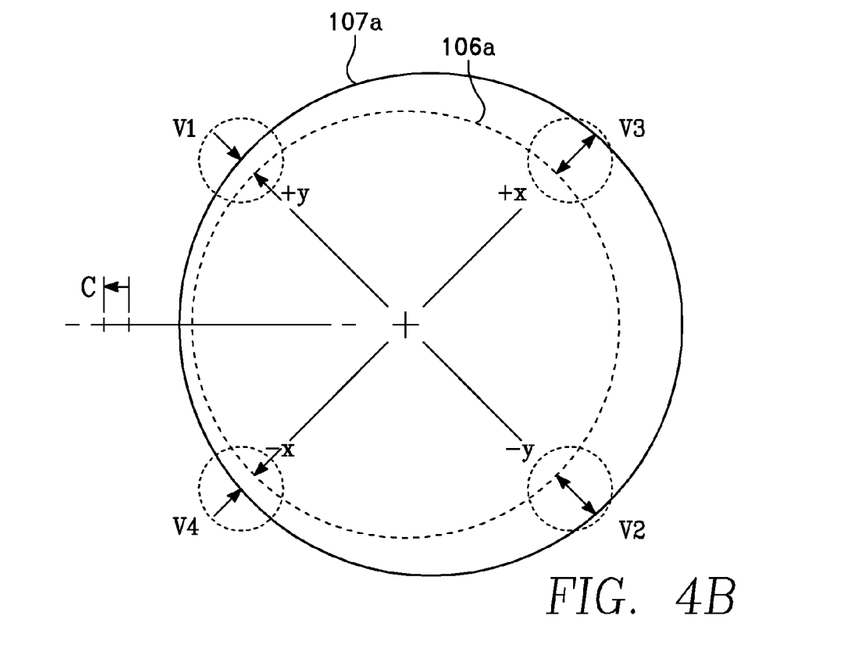

Perfect concentricity between the edge 106a of the electrostatic chuck 106 and the edge 107a of the wafer 107 is depicted in FIG. 4. Such concentricity is manifested by the edge-to-edge distances V1, V2, V3 and V4 being equal to one another. Examples of non-concentricity are depicted in FIGS. 4A and 4B. Non-concentricity is manifested by a non-zero Y-axis difference V2-V1 and/or a non-zero X-axis difference V4-V3. A measure of the non-concentricity (or error in wafer position) may be defined as $|V2-V1|+|V4-V3|$.

Non-concentricity is caused by an error in wafer placement on the electrostatic chuck 106 by the robot 110. Such an error may be corrected (or reduced) by calculating (using conventional techniques) a correction vector C as a function of the edge-to-edge distances V1, V2, V3 and V4. Calculation of such a correction vector is discussed below. The next step is to shift the wafer position on the electrostatic chuck 106 in the direction of the correction vector C and by a distance corresponding to the magnitude of the correction vector C. After shifting the wafer position in accordance with the correction vector C, a new measurement of the edge-to-edge distances V1, V2, V3 and V4 may be performed and the entire procedure repeated. Such repetition may be repeated for iterative improvement in wafer position, until a desired minimization in non-concentricity is reached.

Figure 5:
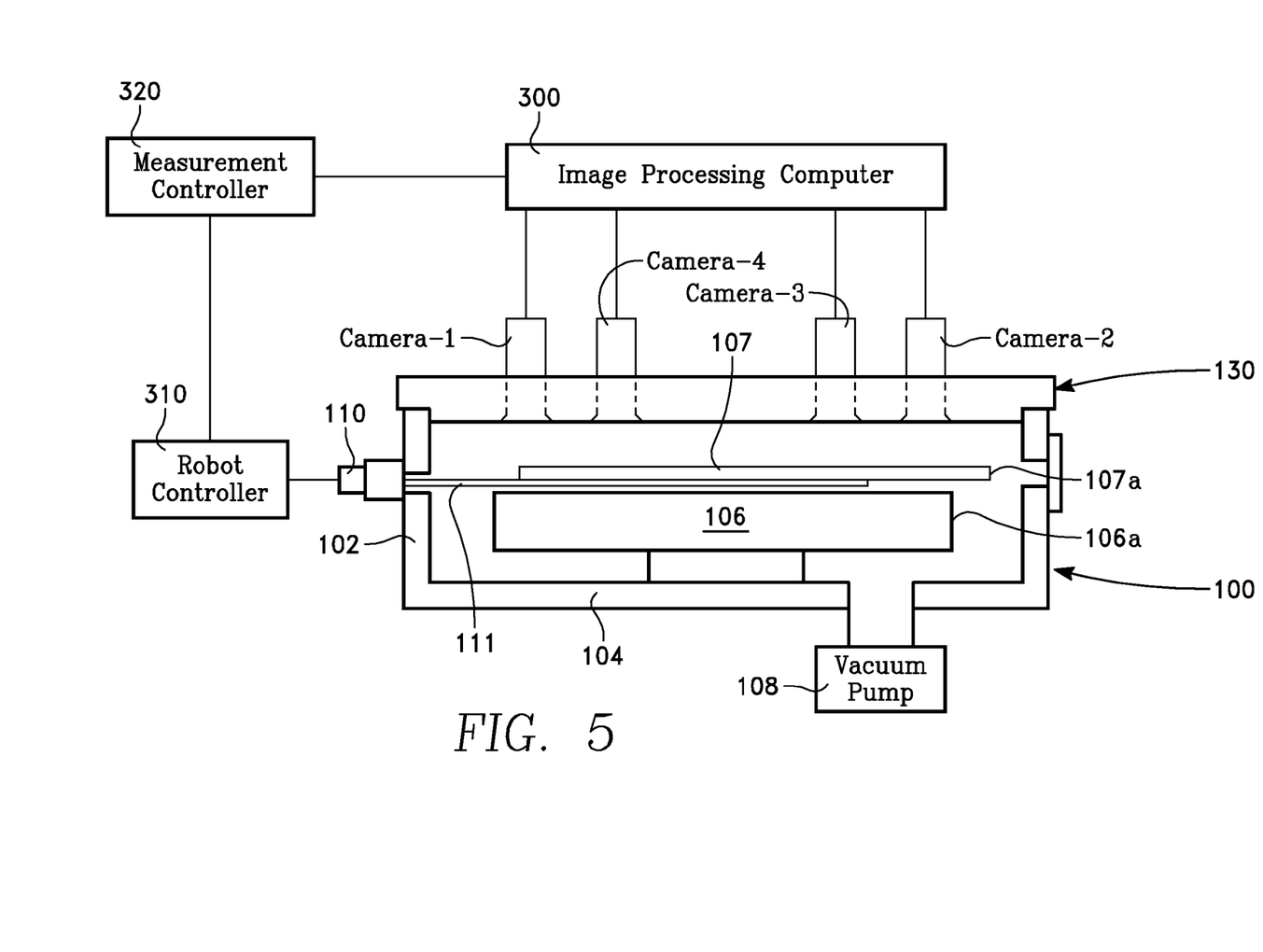
FIG. 5 depicts one embodiment of a system for calibrating wafer placement in a reactor chamber body.

One embodiment of a system for performing the foregoing calibration procedure is depicted in FIG. 5. The system of FIG. 5 includes the features depicted in FIGS. 1B and 2. In addition, the system of FIG. 5 includes an image processor 300 coupled individually to camera 1, camera 2, camera 3 and camera 4. The image processor 300 controls the operation of each one of camera 1, camera 2, camera 3 and camera 4, and may be programmed to analyze each image captured by camera 1, camera 2, camera 3 and camera 4. For example, the image processor 300 may determine location of one of the edges 106a or 107a in the image relative to the camera coordinate system or relative to the other edge, for example. In addition, the system of FIG. 5 further includes a robot controller 310 and a measurement controller 320.

The robot controller 310 responds to commands from the measurement controller 320 to have the robot 110 place the wafer 107 at a specified location. This location may be specified relative to the camera coordinate system (i.e., the X-axis and Y-axis of FIG. 3) or relative to another coordinate system such as a coordinate system of the robot 110, for example. As stated above, the image processor 300 may be programmed to analyze each image and compute the magnitude of respective edge-to-edge distances V1, V2, V3 and V4 from images captured by respective ones of camera 1, camera 2, camera 3 and camera 4. This information may be provided to the measurement controller 320. The measurement controller 320 may employ the respective edge-to-edge distances V1, V2, V3 and V4 to determine the magnitude of non-concentricity. If the magnitude of non-concentricity exceeds a predetermined threshold, then the measurement controller 320 computes a correction vector, C, representing a change wafer position that will reduce (or eliminate) non-concentricity. In one embodiment, the correction vector C may be calculated by defining its component along the Y-axis as V1-V2 and defining its component along the X-axis as V3-V4. The measurement controller 320 then translates the correction vector C to a robot command for shifting the position of the wafer 107 along the direction of the correction vector C by a distance corresponding to the magnitude of the correction vector C. The measurement controller 320 then transmits the robot command to the robot controller 310, so that the robot controller 310 causes the robot 110 to make the desired shift in wafer position on the electrostatic chuck 106.

This shift lessens (or eliminates) non-concentricity. Then, non-concentricity is again measured in the manner described above. If the non-concentricity is still significant, further correction may be achieved by repeating the foregoing process. In this manner, an iterative succession of corrections may be performed if needed, until a final wafer position is reached at which non-concentricity is reduced below the predetermined threshold. In some cases, a single iteration suffices to reach a final wafer position at which non-concentricity is less than the predetermined threshold. The predetermined threshold may correspond to an error of 50 microns or less, requiring high resolution images from the cameras 1-4. Each camera of FIG. 1B, camera 1, camera 2, camera 3 and camera 4, may be provided with a telecentric lens for optimum resolution. Telecentric lenses improve accuracy of pixel scaling, due to invariant magnification over a range in the working distance. Thus, in measuring a distance between two edges by counting pixels, a better accuracy is gained.

Upon reaching a wafer position at which the non-concentricity is less than the predetermined threshold, the current position of the wafer 107 on the electrostatic chuck 106 is stored in a memory as the final wafer position. The memory in which the final wafer position is stored may be a memory in the measurement controller 320. The final wafer position is thus available for use during processing of subsequent wafers. The metrology lid 130 is removed and the process lid 120 is re-installed on the reactor chamber body 100.

Thereafter, a succession of wafers may be processed in the reactor chamber body 100 one at a time. For each wafer, the robot 110 is commanded (e.g., by the measurement controller 320) to position the wafer on the electrostatic chuck 106 at the final wafer position determined in the calibration procedure described above. For example, for each wafer in the succession of wafers to be processed, the measurement controller 320 fetches the final wafer position from memory and commands the robot 110 to position the current wafer on the electrostatic chuck 106 at the final wafer position. The final wafer position is used unchanged for each subsequent wafer because the electrostatic chuck 106 is stationary. This can provide consistent wafer location for a succession of wafers. During processing, RF plasma source power may be applied to the coil antennas 124, temperature control media (e.g., a heat exchange medium such as a coolant) may be circulated through the process lid 120, while process gas is introduced through the gas distribution plate 122.

The foregoing description refers to embodiments employing four cameras. However, any suitable number of cameras may be employed.

Figure 6:
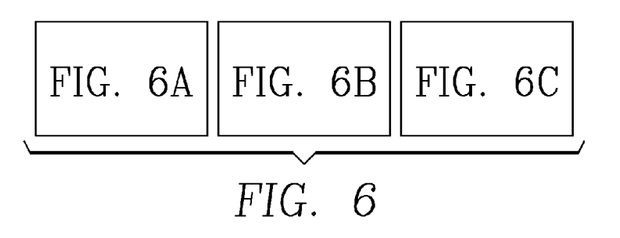
FIG. 6 consists of successive block diagrams of FIGS. 6A-6C depicting a method in one embodiment.
Figure 6A:
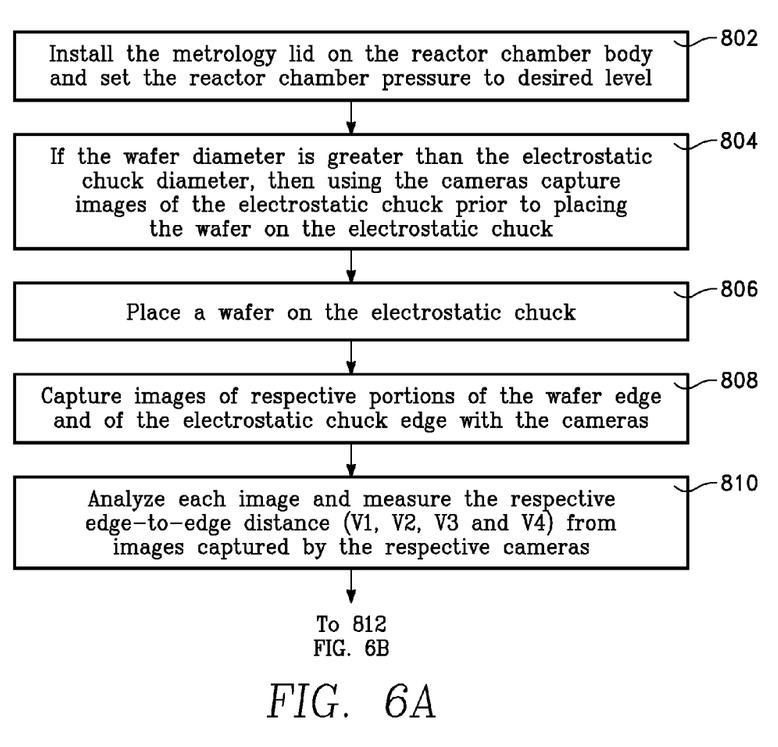
Figure 6B:
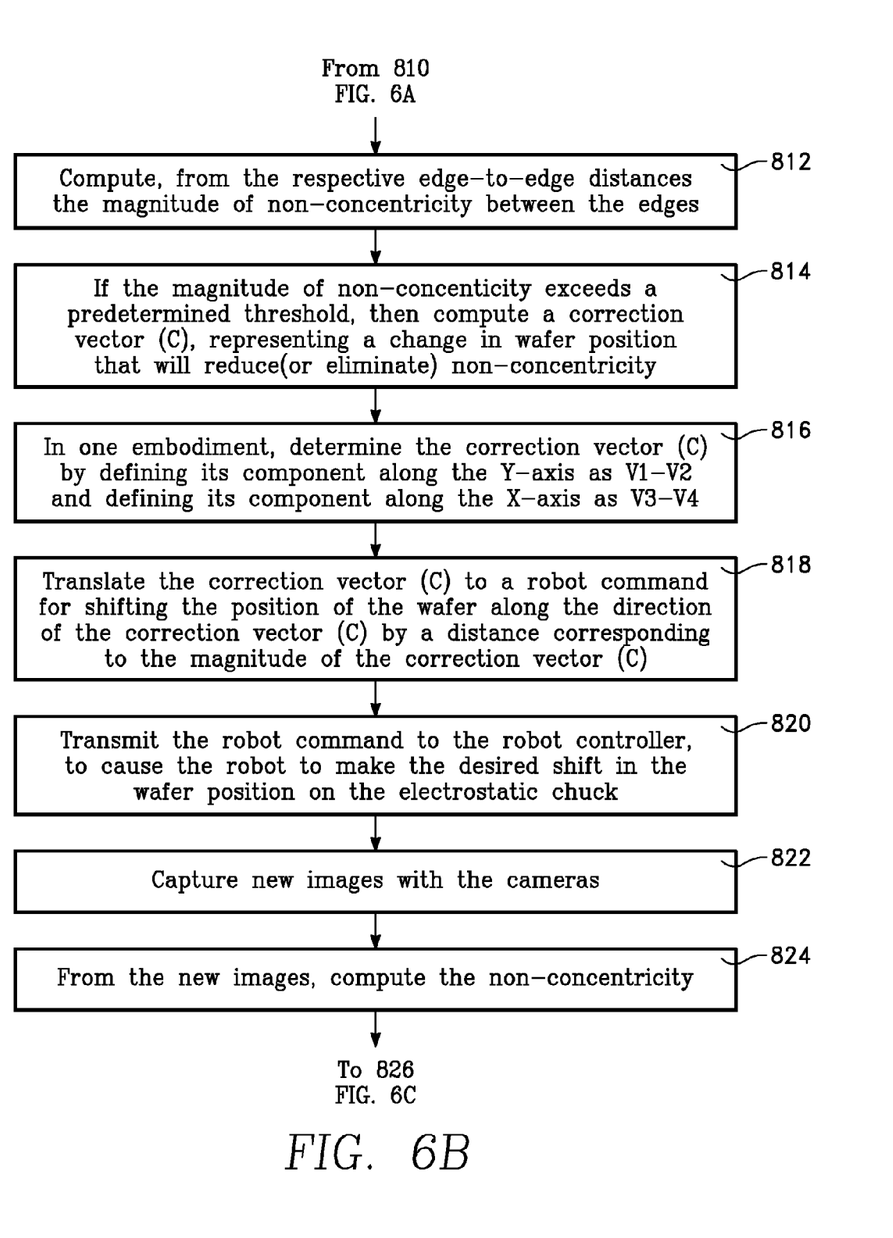
Figure 6C:
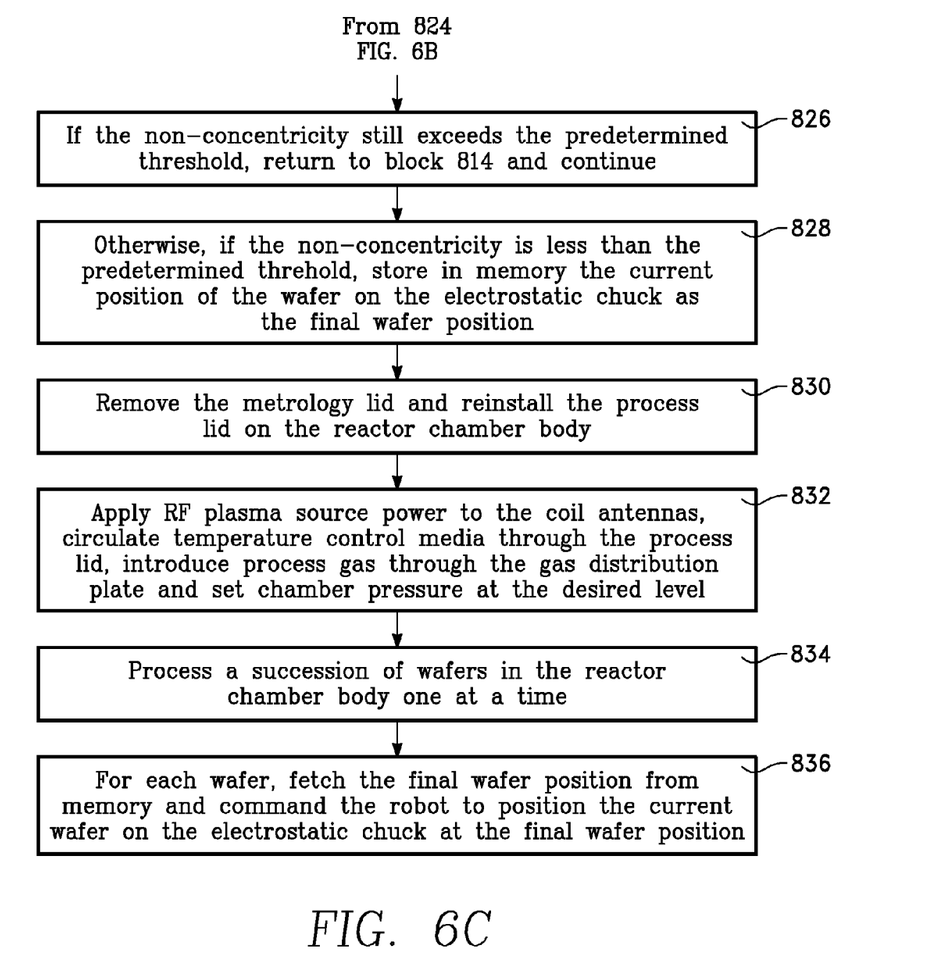

Method:

FIG. 6 consists of successive block diagrams of FIGS. 6A-6C depicting a method The method proceeds as follows:

Install the metrology lid 130 on the reactor chamber body 100 and set reactor chamber pressure to a desired level (block 802).

If the wafer diameter is greater than the electrostatic chuck diameter, then using camera 1, camera 2, camera 3 and camera 4, capture images of the electrostatic chuck 106 prior to placing the wafer 107 on the electrostatic chuck 106 (block 804).

Place a wafer 107 on the electrostatic chuck 106 (block 806).

Capture images of respective portions of the wafer edge 107a and of the electrostatic chuck edge 106a by camera 1, camera 2, camera 3 and camera 4 (block 808).

Analyze each image and measure the respective edge-to-edge distances V1, V2, V3 and V4 from images captured by respective ones of camera 1, camera 2, camera 3 and camera 4 (block 810).

Compute, from the respective edge-to-edge distances V1, V2, V3 and V4, the magnitude of non-concentricity between the edges 106a and 107a (block 812).

If the magnitude of non-concentricity exceeds a predetermined threshold, then compute a correction vector, C, representing a change in wafer position that will reduce (or eliminate) non-concentricity (block 814).

In one embodiment, determine the correction vector C by defining its component along the Y-axis as V1-V2 and defining its component along the X-axis as V3-V4 (block 816).

Translate the correction vector C to a robot command for shifting the position of the wafer 107 along the direction of the correction vector C by a distance corresponding to the magnitude of the correction vector C (block 818).

Transmit the robot command to the robot controller 310, to cause the robot 107 to make the desired shift in wafer position on the electrostatic chuck 106 (block 820).

Capture new images with camera 1, camera 2, camera 3 and camera 4 (block 822).

From the new images, compute the non-concentricity (block 824).

If the non-concentricity still exceeds the predetermined threshold (YES branch of block 826), return to block 814 and continue.

Otherwise, if the non-concentricity is less than the predetermined threshold (NO branch of block 826), store in memory the current position of the wafer 107 on the electrostatic chuck 106 as the final wafer position (block 828).

Remove the metrology lid 130 and reinstall the process lid 120 on the reactor chamber body 100 (block 830).

Apply RF plasma source power to the coil antennas 124, circulate temperature control media through the process lid 120, introduce process gas through the gas distribution plate 122 and set chamber pressure at the desired level (block 832).

Process a succession of wafers in the reactor chamber body 100 one at a time (block 834).

For each wafer, fetch the final wafer position from memory and command the robot 110 to position the current wafer on the electrostatic chuck 106 at the final wafer position (block 836).

Advantages:

The method and apparatus disclosed above enable a robotic system to search and quickly find an optimum location for a workpiece such as a semiconductor wafer in a reactor chamber, using only image processing, without contacting the workpiece or wafer. The search is carried out under process conditions in the chamber. The optimum location may be one at which the workpiece or wafer is centered relative to the workpiece support. The optimum location is stored for use during actual processing by the robotic system to enable it to consistently place successive workpieces at the same optimum location during processing.

Calibration of robotic wafer positioning requires no special wafer in the disclosed embodiments. During calibration, the metrology lid is installed, and the robotic positioning of the workpiece (e.g., a silicon wafer) is calibrated using a production wafer, to determine the optimum robot command for positioning the wafer. Once this is done, a succession of production wafers, each being identical to the production wafer used during calibration, is processed with the process lid installed, by positioning each successive production wafer in accordance with the optimum robot command previously determined during calibration. Since calibration and processing both involve identical production wafers, there are no errors (or only minimal errors) attributable to differences between the wafers used in calibration and processing. Other techniques calibrate the position of a wafer on the workpiece support using a special calibration wafer having sensors to determine its position (the sensors representing additional mass). The characteristics affecting wafer handling by the robot (e.g., the mass) of such a calibration wafer differ from those of a production wafer. Such differences can cause errors in positioning of the production wafers by the robot. This problem is solved in the embodiments of FIGS. 1-6 because the calibration can be performed with a production wafer, no special calibration wafer being required.

While the foregoing is directed to embodiments of the present invention, other and further embodiments of the invention may be devised without departing from the basic scope thereof, and the scope thereof is determined by the claims that follow.

What is claimed is:

1. A configurable assembly comprising:
   a reactor chamber body having an open top and a workpiece support in said reactor chamber body;
   a first lid receivable on said open top to form a seal on said open top, and comprising plural cameras viewing respective fields of view inside said reactor chamber body;
   a second lid receivable on said open top to form a seal on said open top and comprising process features, each one of said first and second lids being removable from said open top for placement of the other one of said first and second lids on said open top;
   a workpiece-handling robot for transporting a workpiece relative to said workpiece support, wherein said respective fields of view correspond to respective edge portions of said workpiece when held on said workpiece support; and
   a processor coupled to receive images from said plural cameras and coupled to control said workpiece-handling robot.

2. The configurable assembly of claim 1 wherein said process features of said second lid comprise a gas distribution plate and an RF power applicator.

3. The configurable assembly of claim 1 wherein said respective fields of view further correspond to respective portions of a reference feature in said reactor chamber body.

4. The configurable assembly of claim 3 wherein said reference feature comprises said workpiece support.

5. The configurable assembly of claim 4 wherein said processor is adapted to determine from said images a correction movement of said workpiece that reduces non-concentricity between said workpiece and said workpiece support.

6. The configurable assembly of claim 5 wherein said processor is coupled to command said workpiece-handling robot for said correction movement.

7. The configurable assembly of claim 5 wherein said workpiece and said workpiece support are each circular.

8. The configurable assembly of claim 1 wherein said cameras have respective fields of view uniformly spaced at periodic intervals relative to a circumference of said workpiece support.

9. The configurable assembly of claim 8 wherein said periodic intervals correspond to 90 degree angles.

10. The configurable assembly of claim 1 further comprising respective viewing ports extending through said first lid between respective ones of said plural cameras and said respective fields of view.

11. A method of processing a workpiece, comprising:
   providing a reactor chamber body having an open top and a workpiece support inside said reactor chamber body;
   placing a first lid on said open top, setting chamber pressure in said reactor chamber body to a selected level, and robotically placing a workpiece on said workpiece support;
   capturing, through said first lid, respective images of portions an edge of said workpiece and an edge of a reference feature in said reactor chamber body in respective fields of view spaced at periodic locations relative to a circumference of said workpiece support and determining a non-concentricity between said workpiece and said reference feature;
   if said non-concentricity exceeds a predetermined threshold, determining from said respective images a correction vector representing a change in location of said workpiece corresponding to a decrease in non-concentricity between said workpiece and said reference feature, and robotically shifting said workpiece in accordance with said correction vector, and then repeating said capturing, determining and shifting; and
   if said non-concentricity is less than the predetermined threshold, storing a present location of the workpiece, replacing said first lid with a second lid comprising process features, establishing process conditions in said reactor chamber body, and robotically placing each one of a succession of workpieces on said workpiece support at said present location.

12. The method of claim 11 wherein said reference feature comprises said workpiece support.

13. The method of claim 11 wherein said process features comprise an RF power applicator and a gas distribution apparatus, and said establishing process conditions comprises providing RF power to said RF power applicator, providing process gas to said gas distribution apparatus and governing pressure in said chamber body by a vacuum pump coupled to said reactor chamber body.

14. The method of claim 11 wherein said determining a non-concentricity comprises:
   measuring in said respective images corresponding edge-to-edge distances along positive and negative portions of respective axes between said workpiece and said reference feature;
   determining differences between respective edge-to-edge distances along the positive and negative portions of each of said axes; and
   adding said differences.

15. The method of claim 11 wherein said determining from said respective images a correction vector comprises:
   measuring in said respective images corresponding edge-to-edge distances along positive and negative portions of respective axes between said workpiece and said reference feature;
   determining differences between edge-to-edge distances along the positive and negative portions of each of said axes; and
   defining components of said correction vector along respective ones of said axes as the differences along corresponding axes.

16. The method of claim 14 wherein said capturing through said first lid respective images comprises capturing images through respective cameras on said first lid in respective fields of view coinciding with intersections between respective ones of said axes and said edge of said workpiece support.

17. An assembly for calibrating robotic placement of a workpiece having a workpiece edge onto a workpiece support surface having a support edge, said assembly comprising:
- a reactor chamber body having a top opening and containing said workpiece support surface;
- a lid removably installable on said reactor chamber body and comprising top and bottom surfaces, said bottom surface comprising a sealing shoulder receivable on said top opening, and plural viewing ports extending through said lid along a direction transverse to said top and bottom surfaces;
- plural cameras mounted on said lid along respective axes, and having respective fields of view through respective ones of said plural viewing ports, said respective fields of view coinciding with respective intersections of said support edge and respective ones of said axes; and
- a processor coupled to receive from said cameras images of said support edge and of said workpiece edge, corresponding to workpiece edge-to-support edge distances along respective ones of said axes.

18. The assembly of claim 17 wherein said processor is adapted to determine from said workpiece edge-to-support edge distances a shift in position of said workpiece for reducing non-concentricity between said workpiece edge and said support edge.

19. The assembly of claim 18 wherein said respective axes are mutually orthogonal and said plural cameras comprises four cameras.

20. The assembly of claim 17 further comprising a workpiece handling robot with said reactor chamber body, said processor coupled to said workpiece handling robot.

* * * * *